(12) United States Patent
Kano

(10) Patent No.: US 9,942,433 B2
(45) Date of Patent: Apr. 10, 2018

(54) IMAGE FORMING APPARATUS AND RECORDING MEDIUM

(71) Applicant: Konica Minolta, Inc., Chiyoda-ku, Tokyo (JP)

(72) Inventor: Takahiro Kano, Toyonaka (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 15/140,978

(22) Filed: Apr. 28, 2016

(65) Prior Publication Data
US 2016/0337543 A1    Nov. 17, 2016

(30) Foreign Application Priority Data
May 12, 2015  (JP) .................................. 2015-97343

(51) Int. Cl.
*G06F 15/00*   (2006.01)
*H04N 1/00*    (2006.01)
(Continued)

(52) U.S. Cl.
CPC ........... *H04N 1/00938* (2013.01); *G06F 8/61* (2013.01); *G06F 9/4448* (2013.01);
(Continued)

(58) Field of Classification Search
CPC ....... H04N 1/00464; H04N 2201/0094; H04N 1/00344; G06F 17/2836; G06F 8/61
(Continued)

(56) References Cited

U.S. PATENT DOCUMENTS

| 5,745,881 A | 4/1998 | Tada et al. |
| 8,887,181 B1 | 11/2014 | Gigliotti et al. |

(Continued)

FOREIGN PATENT DOCUMENTS

| EP | 1 870 804 A1 | 12/2007 |
| JP | S-64-42770 A | 2/1989 |

(Continued)

OTHER PUBLICATIONS

The extended European Search Report dated Sep. 26, 2016 by the European Patent Office in rresponding European Patent Application No. 16168716.5-1902. (13 pages).

(Continued)

*Primary Examiner* — Saeid Ebrahimi Dehkordy
(74) *Attorney, Agent, or Firm* — Buchanan Ingersoll & Rooney PC

(57) ABSTRACT

An image forming apparatus includes an installer portion, the installer portion being capable of installing a translation data application and an add-on application on the image forming apparatus, the add-on application for customizing functions of the image forming apparatus. The translation data application has a data structure including: a translation data file containing multiple terms in one or more languages; and a definition file specifying an access method for the add-on application to access the translation data application and a function for the add-on application to extract a target term in a target language from the translation data file. Upon activation of the add-on application, the add-on application performs the following operations: accessing the translation data application by the access method; extracting a target term in a target language from the translation data file by the function; and generating a display screen using the extracted term.

14 Claims, 11 Drawing Sheets

(51) Int. Cl.
  *G06F 17/28* (2006.01)
  *G06F 9/445* (2018.01)
  *G06F 9/44* (2018.01)
  *G06F 21/62* (2013.01)
  *G06F 21/44* (2013.01)

(52) U.S. Cl.
  CPC ...... *G06F 9/44521* (2013.01); *G06F 9/44526* (2013.01); *G06F 17/2836* (2013.01); *G06F 21/6209* (2013.01); *G06F 21/6272* (2013.01); *H04N 1/0097* (2013.01); *H04N 1/00344* (2013.01); *H04N 1/00408* (2013.01); *H04N 1/00464* (2013.01); *H04N 1/00474* (2013.01); *H04N 1/00482* (2013.01); *H04N 1/00498* (2013.01); *H04N 1/00511* (2013.01); *H04N 1/00941* (2013.01); *H04N 1/00973* (2013.01); *G06F 21/44* (2013.01); *H04N 2201/0094* (2013.01)

(58) Field of Classification Search
  USPC .............................................. 358/1.13–1.15
  See application file for complete search history.

(56) References Cited

U.S. PATENT DOCUMENTS

| | | |
|---|---|---|
| 8,935,755 B1 | 1/2015 | Kay |
| 2007/0244980 A1 | 10/2007 | Baker, III et al. |
| 2008/0103757 A1 | 5/2008 | Washizawa et al. |
| 2008/0244397 A1 | 10/2008 | Ferlitsch |
| 2009/0064309 A1 | 3/2009 | Boodaei et al. |
| 2010/0146379 A1 | 6/2010 | George et al. |
| 2011/0007351 A1* | 1/2011 | Kurumasa .......... H04N 1/00204 358/1.15 |
| 2011/0145843 A1 | 6/2011 | Ohhashi et al. |
| 2011/0235122 A1* | 9/2011 | McCann ................ G06F 9/4448 358/1.16 |
| 2013/0144596 A1 | 6/2013 | Lui et al. |

FOREIGN PATENT DOCUMENTS

| | | |
|---|---|---|
| JP | 2000-207395 A | 7/2000 |
| JP | 2014-063472 A | 4/2014 |

OTHER PUBLICATIONS

Notice of Reasons for Refusal dated May 2, 2017, issued by the Japanese Patent Office in corresponding Japanese Patent Application No. 2015-097343, and English translation (9 pages).

* cited by examiner

```
                                                              302
┌─────────────────────────────────────────────────────────┐
│ Resource.dat (Translation Data File)                    │
│ LangID    English          Japanese        Icon Images  │
│ ID_1      Scan Settings    スキャン設定         ☐        │
│ ID_2      Paper Size       用紙サイズ           ☐        │
│ ID_3      Color Setting    カラー設定           ☐        │
│ ...       ...              ...             ...          │
└─────────────────────────────────────────────────────────┘
```

FIG.3

```
                                                    ┌─701
      Copy
   LangID    English              Japanese
   ID_1      Copy Settings        コピー設定
   ID_2      The number of copies 部数
   ID_3      Color Setting        カラー設定
   ...       ...                  ...

┌─703
      FAX
   LangID    English              Japanese
   ID_1      Copy Settings        カラー設定
   ID_2      resolution           解像度
   ...       ...                  ...
```

FIG.9

```
                  ┌─704
   English
   ID_1    Copy
   ID_2    Scan
   ID_3    FAX
   ...     ...

┌─705
   Japanese
   ID_1    コピー
   ID_2    スキャン
   ID_3    ファックス
   ...     ...
```

FIG.10

IMAGE FORMING APPARATUS AND RECORDING MEDIUM

BACKGROUND OF THE INVENTION

Field of the Invention

This application claims priority under 35 U.S.C. § 119 to Japanese Patent Application No. 2015-097343 filed on May 12, 2015, the entire disclosure of which is incorporated herein by reference in its entirety.

The present invention relates to: an image forming apparatus such as a multifunctional digital image forming apparatus (i.e., a multi-function peripheral abbreviated as MFP) having multiple functions, e.g., copier function, printer function, facsimile function, and scanner function; and a recording medium.

Description of the Related Art

The following description sets forth the inventor's knowledge of related art and problems therein and should not be construed as an admission of knowledge in the prior art.

While users can purchase add-on applications (also to be referred to as "add-on apps" for short) for customizing functions of image forming apparatuses as described above, which are provided by third-party vendors, there have been well-known image forming apparatuses having a configuration allowing users to install such add-on apps.

FIG. 12 illustrates how such a well-known image forming apparatus installs add-on apps. A user purchases add-on apps A, B, and C provided by vendors A, B, and C, respectively, and installs them on a MFP 1000. As referred to FIG. 12, the MFP 1000 has a storage device 1100, and the add-on apps A, B, and C are stored on directories A0000001, A0000002, and A0000003 in the storage device 1100, respectively.

The add-on apps A, B, and C are configured not to access each other for security purposes.

Upon activation, the add-on app A, B, and C generate a display screen to be displayed on a display panel; for example, they generate a settings screen showing various terms such as function names and setting items. In order to promote the MFP 1000 in different countries and regions, it is preferred that the add-on apps A, B, and C be localized to a ship-to country or region of the MFP 1000 and be configured to display information on a display screen in a suitable language for the ship-to country or region.

To localize the add-on apps A, B, and C to a ship-to destination, it can be a solution for the add-on apps A, B, and C to include their own translation data files. This solution, however, brings another problem as described below.

When the add-on apps A, B, and C include their own translation data files, these translation data files are largely the same because of the same function names and setting items of the MFP 1000. As referred to FIG. 13, the add-on apps A, B, and C are stored on the directories A0000001, A0000002, and A0000003 in the storage device 1100 of the MFP 1000, respectively. When the add-on apps A, B, and C include their own translation data files 1200 (each contains English and Japanese strings for each term identified by a term ID in the example of FIG. 13), these translation data files 1200, which are largely the same, are also stored on the directories as resource data files. This can cause the problem of an inefficient use of memory space in the storage device 1100. Normally, every vendor is in responsible for localization of its own add-on app. So, the vendors A, B, and C separately do their localizations and prepare their own translation data files, which is not advantageous from an efficiency perspective.

It can be another solution for the MFP 1000 to store the translation data files on its firmware. This solution, however, brings yet another problem as described below. The MFP 1000 is subject to a technical field service for firmware update in order to have a new translation data file or update the existing translation data files. The MFP 1000 further needs to store a conversion database for mapping necessary terms from the translation data files. The translation data files contain different terms and term IDs for identifying the terms depending on the model they support. When the translation data files contain terms in too many languages for a ship-to destination of one single language, this causes the problem of an inefficient use of the hardware resources of the MFP 1000.

Japanese Patent Application Laid-open Publication No. 2000-207395 discloses a Japanese analysis device that performs a word determining process using the converter information input to a character converter device and the indexes of a character conversion dictionary and a Japanese analysis dictionary. By consolidating the indexes of these dictionaries, the Japanese analysis device is capable of making more memory space available and thus saving the resources of information apparatuses.

Japanese Patent Application Laid-open Publication No. H01-042770 suggests a language analysis device that performs a description conversion process and a description analysis in an efficient manner without the need for an extra memory for a dictionary.

The techniques disclosed in these publications are not indented to localize the add-on apps A, B, and C to a ship-to destination. So, these publications cannot provide a solution to the problem of when the add-on apps A, B, and C include their own translation data files, and also cannot provide a solution to the problem of when the MFP 1000 stores their translation data files on its firmware.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to an image forming apparatus comprising an installer means, the installer portion being capable of installing a translation data application and an add-on application on the image forming apparatus, the add-on application for customizing functions of the image forming apparatus, wherein:

the translation data application installed by the installer portion has a data structure including:

a translation data file containing multiple terms in one or more languages; and a definition file specifying an access method for the add-on application to access the translation data application and a function for the add-on application to extract a target term in a target language from the translation data file; and upon activation of the add-on application installed by the installer portion, the add-on application performs the following operations:

accessing the translation data application by the access method specified by the definition file, the definition file being included in the translation data application;

extracting a target term in a target language from the translation data file by the function specified by the definition file; and generating a display screen using the extracted term.

A second aspect of the present invention relates to a non-transitory computer-readable recording medium storing a translation data application, the translation data application being installed on an image forming apparatus, the translation data application providing a translation data file to an add-on application, the add-on application for customizing functions of the image forming apparatus, wherein:

the translation data application includes: the translation data file containing multiple terms in one or more languages; and a definition file specifying an access method for the add-on application to access the translation data application, the definition file specifying a function for the add-on application to extract a target term in a target language from the translation data file.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIG. 3 illustrates s another example of the translation data file;

FIG. 9 illustrates an example of translation data files classified into copier function group and facsimile function group;

FIG. 10 illustrates an example of translation data files classified into language groups;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
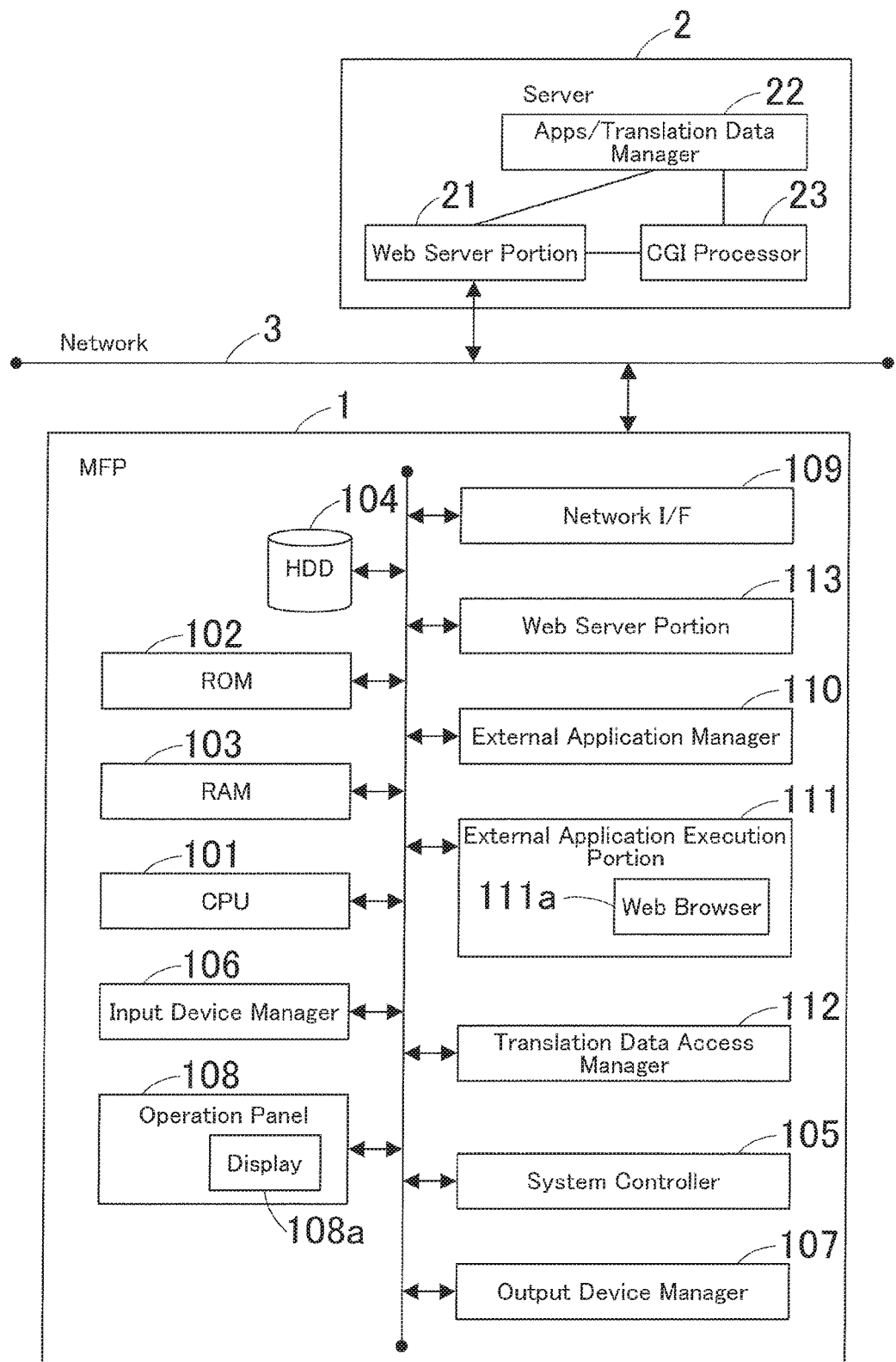
FIG. 1 illustrates a configuration of a network system including an image forming apparatus according to one embodiment of the present invention.

FIG. 1 illustrates a configuration of a network system including an image forming apparatus according to one embodiment of the present invention. This network system is provided with an image forming apparatus 1 and a server 2 connected to a network 3 such as the Internet.

In this embodiment, a MFP, having various functions such as copier function, printer function, scanner function, and facsimile function as described above, is employed as the image forming apparatus 1. Hereinafter, the image forming apparatus 1 will also be referred to as MFP 1.

The MFP 1 is essentially provided with a CPU 101, a ROM 102, a RAM 103, a storage device 104, a system controller 105, an input device manager 106, an output device manager 107, an operation panel 108, a network interface (network I/F) 109, an external application manager 110, an external application execution portion 111, a translation data access manager 112, and a Web server portion 113. These elements are interconnected through a system bus.

The CPU 101 controls the MFP 1 in a unified and systematic manner by executing programs stored on a recording medium such as the ROM 102. The CPU 101 further executes a translation data application and add-on applications which will later be described in details.

The ROM 102 stores programs for the CPU 101 to execute and other data.

The RAM 103 serves as a work area for the CPU 101 to load programs, and temporarily stores programs, data for executing the programs, and other data.

The storage device 104 is comprised of a hard disk drive (HDD) and stores applications and data of various types.

The system controller 105 is essentially comprised of the above-described CPU 101, ROM 102, and RAM 103 and controls the entire system of copier function, printer function, scanner function, and other functions of the MFP 1.

The input device manager 106 is provided with a scanner, for example, and obtains a document image by scanning a document put on a platen and converts it into image data format.

The output device manager 107 is provided with a printer, for example, and forms a reproduced image on a sheet of paper.

The operation panel 108 allows users to give instructions for a job, for example, to the MFP 1 and configure various settings of the MFP 1. The operation panel 108 is essentially provided with a display 108a having a touch panel.

The network interface 109 serves as a communication portion that supports data communications with the server 2.

The external application manager 110 installs and uninstalls applications and manages applications installed on the MFP 1. The external application manager 110 further controls operations such that only an add-on application allowed to access a translation data application is installed on the MFP 1, which will be later described in details.

The external application execution portion 111 is comprised of a run-time library for applications to run and a group of modules such as a screen display module. The external application execution portion 111 includes a Web browser 111a.

The translation data access manager 112 is a group of modules serving as an intermediary for add-on applications to access a translation data application. The translation data access manager 112 includes a DLL which will be later described in details. The translation data access manager 112 further controls operations such that only an add-on application allowed to access the translation data application accesses the translation data application, which will be later described in details.

The Web server portion 113 provides a Web server capability to the MFP 1.

Hereinafter, applications also will be referred to as "apps" for short.

An add-on app is an app for customizing functions of the MFP 1, such as printer function and scanner function, and third-party vendors and a manufacturer of the MFP 1 provide add-on apps. In this embodiment, the MFP 1 has a configuration allowing users to purchase, download, and install a desirable add-on app from the server 2.

A translation data application includes a translation data file containing terms in one or more languages in order to localize the add-on apps to a ship-to country or region of the MFP 1. The add-on apps share this translation data file, and do not need anymore to include their own translation databases. The translation data application further includes a definition file that specifies an access method for the add-on apps to access the translation data app and that includes a function that specifies a term and a language by which the add-on apps can extract strings from the translation data file. The translation data app will be later described in details.

In this embodiment, upon instructions from the user, the MFP 1 downloads and installs a translation data app from the server 2.

The server 2 is comprised of a personal computer, for example. The server 2 is essentially and functionally provided with a Web server portion 21, an apps/translation data manager 22, and a CGI processor 23.

The Web server portion 21 transmits an add-on app, a translation data app, and another application to the MFP 1 through the network 3 as requested by the Web browser 111a of the MFP 1.

The apps/translation data manager 22 stores multiple add-on apps, a translation data app, and translation data files each containing terms in multiple languages and each being classified into a function group. The apps/translation data manager 22 further manages destinations of the add-on apps and the translation data app.

When the Web server portion 21 receives a request for the translation data app from the MFP 1, the common gateway interface (CGI) processor 23 activates a program to start a process requested by the Web server portion 21.

Figure 2:
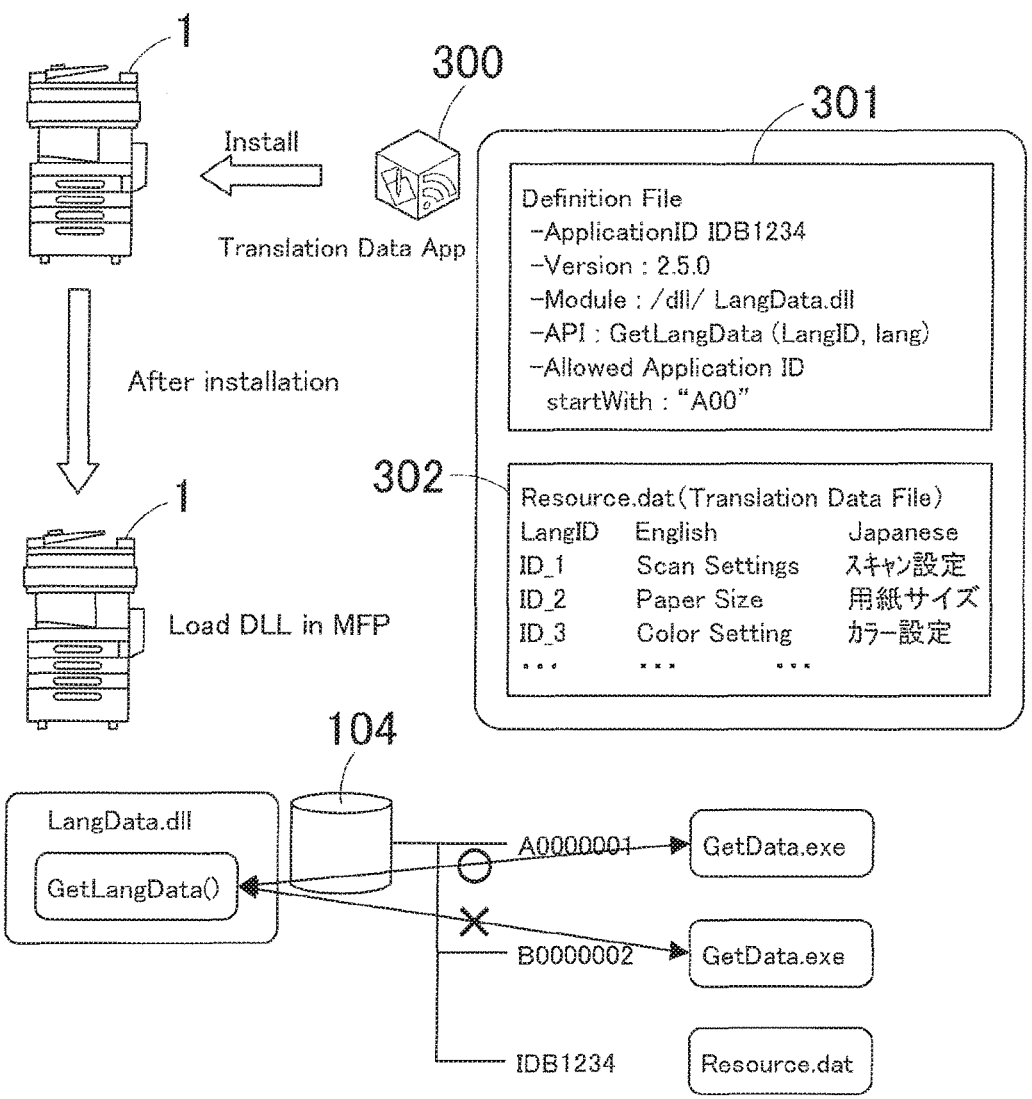
FIG. 2 is a view for explaining a translation data application and the operations to be performed by the image forming apparatus after installation of the translation data application.

FIG. 2 is a view for explaining a translation data application 300 and the operation to be performed by the MFP 1 after installation of the translation data application 300.

The translation data app 300 includes a definition file 301 that specifies an access method for the add-on apps to access the translation data app 300 and that includes a function that specifies a term and a language by which the add-on apps can extract strings. The translation data app 300 further includes a translation data file 302 ("resource.dat").

As referred to FIG. 2, the definition file 301 contains the following information: an app ID ("applicationID") that is identification information of the translation data app 300; version information ("version"); module information ("module"); an application programming interface (API) information; and an allowed app ID.

The app ID, which is identification information of the translation data app 300, uniquely defines the translation data app 300. The app ID also defines the translation data app 300 as being of the category of translation data app. The app ID includes a preset flag (the code "IDB" in the example of FIG. 2). The MFP 1 judges the translation data app 300 as being accessible from the add-on apps, with the presence of this flag. The app ID also verifies the authenticity of the translation data app 300. To avoid the risk of being rewritten, the app ID may be embedded in a certificate form of the translation data app 300, not in the definition file 301. In this case, the MFP 1 refers to the certificate form to find out the app ID during installation of the translation data app 300.

The version information represents the version of the translation data app 300.

The module information specifies a link to a dynamic link library (DLL) that is a module as an access method for the add-on apps to access the translation data app 300. In this embodiment, the DLL "LangData.dll" is referenced by the link. The DLL is pre-installed on the MFP 1: the translation data access manager 112, for example, originally stores the DLL before shipment of the MFP 1. Alternatively, the translation data app 300 may originally include the DLL. In this case, the MFP 1 obtains a copy of it during installation of the translation data app 300.

The API information represents a function that specifies a term and a language by which the add-on apps can extract strings from the translation data file 302. In this embodiment, the add-on apps specify a term ID ("LangID") and a language ("lang") by the function "GetLangData (LangID, lang)" and access the translation data app 300.

The allowed app ID is identification information of an add-on app allowed to access the translation data app 300. The allowed app ID serves as definition information defining the add-on apps as being or not being allowed to access the translation data app 300.

As referred to FIG. 2, the translation data file 302, which is included in the translation data app 300, contains term IDs ("LangID") for identifying terms and also contains strings in different languages (English and Japanese strings in the example of FIG. 2) for each term. For example, English and Japanese strings are prepared for the term "scan settings" identified by the term ID "ID_1"; other English and Japanese strings are prepared for the term "paper size" identified by the term ID "ID_2"; yet other English and Japanese strings are prepared for the term "color setting" identified by the term ID "ID_3".

As referred to FIG. 2, upon instructions from the user, the MFP 1 downloads and installs the translation data app 300 from the server 2. The MFP 1 stores the translation data app 300 on the storage device 104. When the translation data app 300 is not installed, the DLL indicated in the module information in the definition file 301, which is included in the translation data app 300, is disabled. Upon installation of the translation data app 300, the DLL is enabled by being loaded in a system of the MFP 1 such as the RAM 103.

As described above, the DLL is disabled until installation of the translation data app 300, which will eliminate the risk of rewriting or deleting data accidentally. Furthermore, upon installation of the translation data app 300, the DLL is enabled by being loaded in a system of the MFP 1. With this configuration, the MFP 1 can keep more memory space available until installation of the translation data app 300.

When the user gives instructions for installation of a necessary add-on app, the MFP 1 downloads and installs it from the server 2. When the user activates the add-on app stored on the storage device 104 (the add-on app stored on the directory A0000001 in FIG. 2, for example) by executing the execution file "getdata.exe", the add-on app references the DLL that is a module by the link. The add-on app specifies a term ID and a language by the function "GetLangData (LangID, lang)" in the definition file 301, accesses the translation data app 300, and extracts strings by the specified term ID and language from the translation data file 302. The add-on app generates a display screen using the extracted strings to display on the display 108a.

When the definition file 301 defines the add-on app (the add-on app stored on the directory A0000002 in FIG. 2, for example) as not being allowed to access, the add-on app is prohibited from accessing the translation data app 300. Alternatively, when the definition file 301 defines the add-on app as not being allowed to access, the add-on app may be prohibited from being installed on the MFP 1.

As referred to FIG. 3, the translation data file 302 may include icon images each representing a term to show on a display screen, in addition to strings in different languages for each term. In this case, the add-on app extracts an icon image by a specified term ID and type of image. An icon image data file, instead of the translation data file 302, may contain these icon images.

In this case, the add-on applications share the icon images as well as the translation data file 302. The add-on applications can extract an icon image to show on a display screen.

Figure 4:
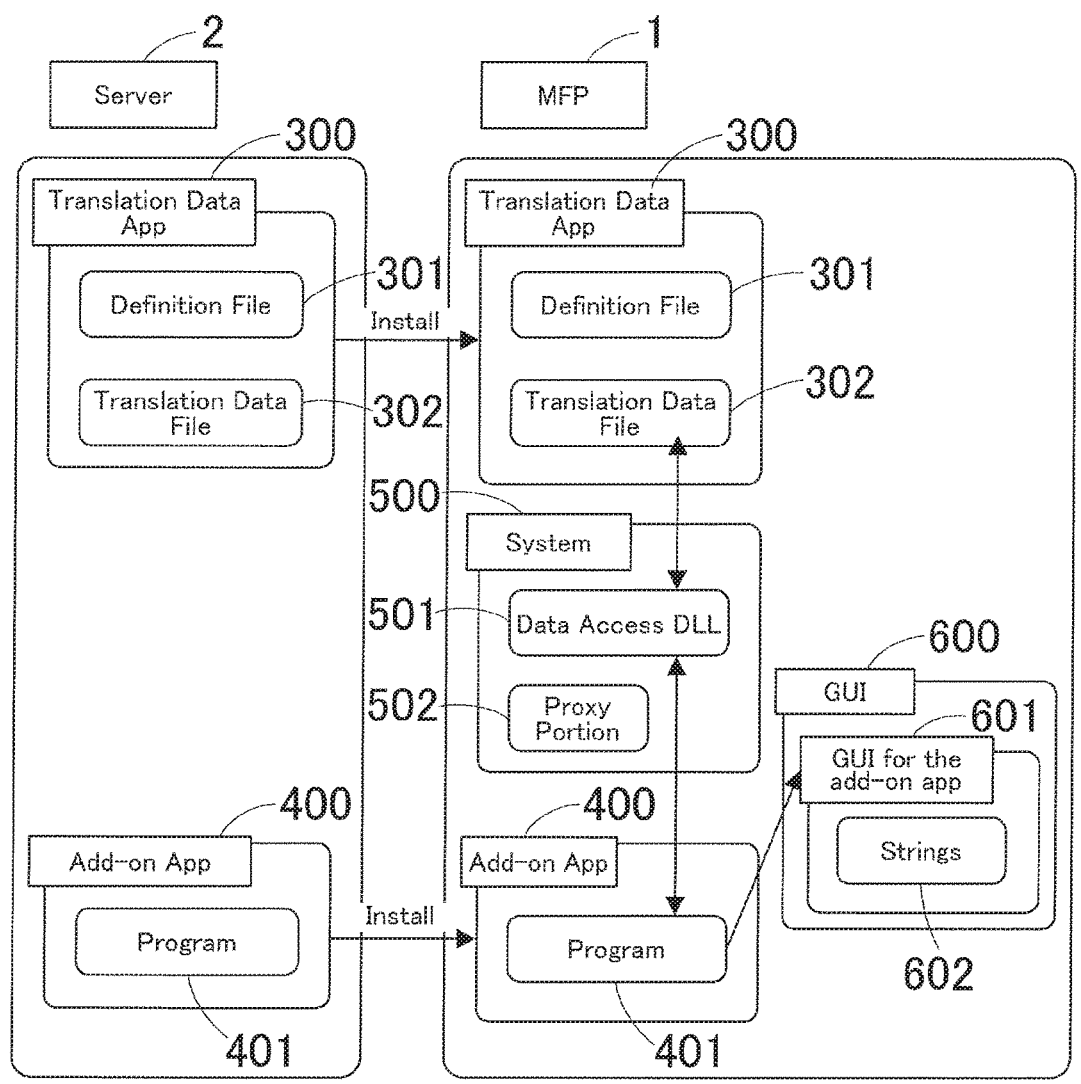
FIG. 4 is a diagram for explaining how the add-on application generates a display screen after the image forming apparatus downloads the translation data application and the add-on application from a server.

FIG. 4 is a diagram for explaining how an add-on app 400 generates a display screen after the MFP 1 downloads the translation data app 300 and the add-on app 400 from the server 2.

The server 2 stores the translation data app 300, the add-on app 400, and an optional data package 700 for the translation data app 300. The translation data app 300 includes the definition file 301 and the translation data file 302 as described above.

The add-on app 400 includes a program 401 for the add-on app 400 to run.

The user gives instructions for installation of the translation data app 300, then the MFP 1 downloads and installs it from the server 2. Upon installation of the translation data app 300, a DLL 501 is enabled by being loaded in a system 500 of the MFP 1.

After successful installation of the translation data app 300, the user further gives instructions for installation of the desirable add-on app 400. The MFP 1 then downloads and installs it from the server 2.

Upon activation of the add-on app 400 installed on the MFP 1, the add-on app 400 references the DLL 501 by the link. The add-on app 400 specifies a term ID and a language by the function "GetLangData (LangID, lang)" and accesses the translation data app 300 in accordance with the DLL 501. The add-on app 400 obtains strings 602 by the specified term ID and language from the translation data file 302 which is included in the translation data app 300. For a better processing efficiency, the translation data file 302 may be expanded in the RAM 103.

The add-on app 400 generates a display screen by using its own user interface (UI) 601 to lay out the strings 602 on the display screen. A graphical user interface (GUI) 600 of the MFP 1 receives the display screen, and the Web browser 111a shows the display screen on the display 108a.

In this embodiment, the MFP 1 is further provided with a proxy portion 502. The proxy portion 502 serves as an intermediary that blocks the add-on apps 400 from directly accessing the translation data app 300 and also blocks the add-on apps 400 from directly accessing each other. This will improve security.

Figure 5:
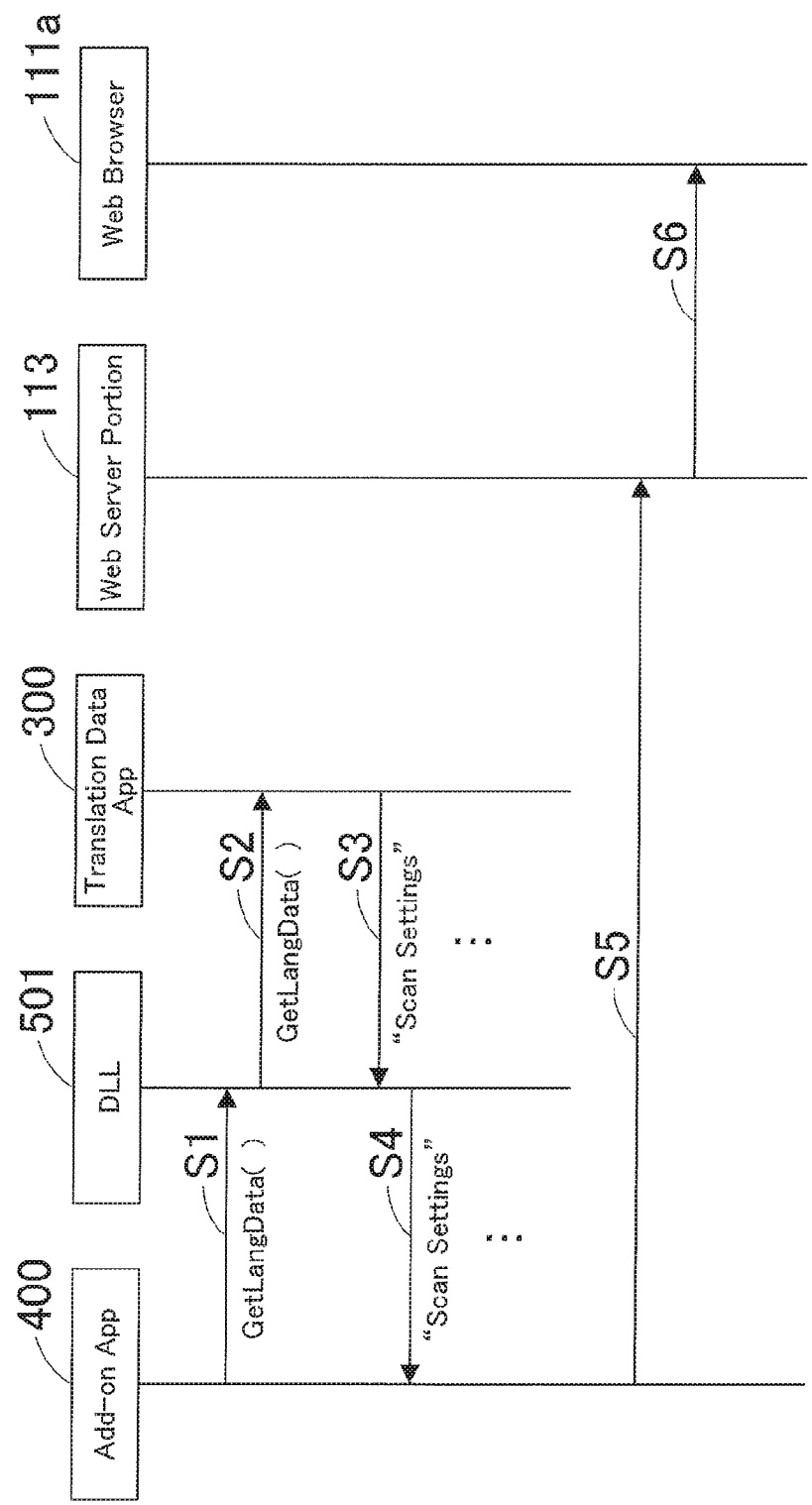
FIG. 5 is a sequence diagram representing how the add-on application installed on the image forming apparatus negotiates with the translation data application to extract a term.

FIG. 5 is a sequence diagram representing how the add-on app 400 installed on the MFP 1 negotiates with the translation data app 400 to extract a term.

The add-on app 400 references the DLL 501. The add-on app 400 specifies a term and a language by the function "GetLangData (LangID, lang)" and requests the DLL 501 for access to the translation data app 300 (Step S1). The DLL 501 transfers the function "GetLangData (LangID, lang)" to the translation data app 300 (Step S2).

The translation data app 300 extracts strings ("scan settings" in the example of FIG. 5) by the specified term ID and language from the translation data file 302 and returns the strings to the DLL 501 (Step S3). The DLL 501 transfers the strings to the add-on app 400 (Step S4). The routine repeats these processes until completing all necessary terms for a display screen. After completion of all necessary terms, the add-on app 400 generates a display screen and transmits it to the Web server portion 113 (Step S5). The Web server portion 113 transfers the screen display to the Web browser 111a (Step S6). The Web browser 111a shows the display screen on the display 108a.

The add-on app 400 may not request to extract strings by a specified term and language; that is, the add-on app 400 may request to extract all strings from the translation data file. In this case, the Web browser 111a receives all the strings, and the add-on app 400 requests the Web browser 111a to select strings by a specified term and language and lay them out at specified positions on a display screen.

As described above, in this embodiment, the translation data app 300 has a data structure including the definition file 301. The definition file 301 specifies a link to the DLL 501 as an access method for the add-on apps 400 to access the translation data app 300 and includes a function that specifies a term and a language by which the add-on apps 400 can extract strings from the translation data file 302. Upon activation of the add-on app 400 installed on the MFP 1, the add-on app 400 references the DLL 501 by the link. The add-on app 400 then performs the following operations: accessing the translation data app 300, extracting a specified term in a specified language from the translation data file 302 by the function, and generating a display screen using the obtained term. The add-on apps 400 can generate a display screen using the same translation data file 302 which is included in the translation data app 300. This means, the add-on apps 400 do not need anymore to include their own language data files. So, this will be a solution to the problem of an inefficient use of memory space in the storage device 104. Furthermore, the vendors of the add-on apps 400 do not have to separately do their localizations and prepare their own translation data files. Since the add-on apps 400 share one translation database, the add-on apps 400 can generate a display screen using the same terms.

Furthermore, the MFP 1 does not store the translation data files on its firmware, and the translation data app 300 includes the translation data file 302. The MFP 1 is not subject anymore to a technical field service for firmware update in order to have a new translation data file or update the existing translation data files. The MFP 1 does not need to store a conversion database for mapping necessary terms from the translation data files.

Furthermore, the add-on apps 400 access the translation data app 300 not in a direct manner, but by the access method specified in the definition file 301 which is included in the translation data app 300. The add-on apps 400 then extracts a specified term in a specified language from the translation data file 302 by the function. This means, the add-on apps 400 provided by third-party vendors can share the translation data file 302 without compromising security.

Figure 6:
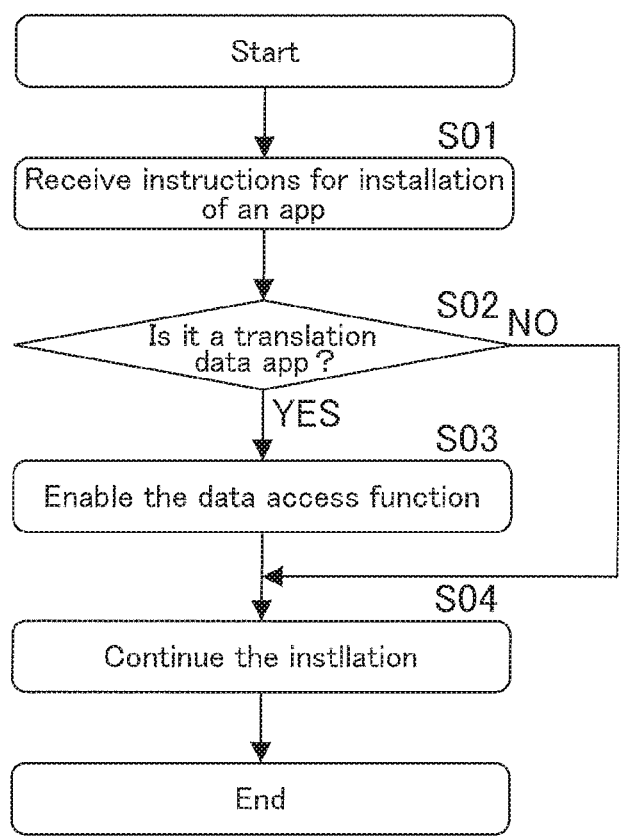
FIG. 6 is a flowchart representing how the image forming apparatus installs the translation data application.

FIG. 6 is a flowchart representing how the MFP 1 installs the translation data app 300.

In Step S01, instructions for installation of an application are received. In Step S02, it is judged whether or not it is the translation data app 300. The judgment on whether or not it is the translation data app 300 depends on the app ID in the definition file 301.

If it is the translation data app 300 (YES in Step S02), the function (access function) represented by the API information is enabled in Step S03. The routine then continues the installation in Step S04. Back to Step S02, if it is not the translation data app 300 (NO in Step S02), the routine skips to Step S04 to continue the installation.

Figure 7:
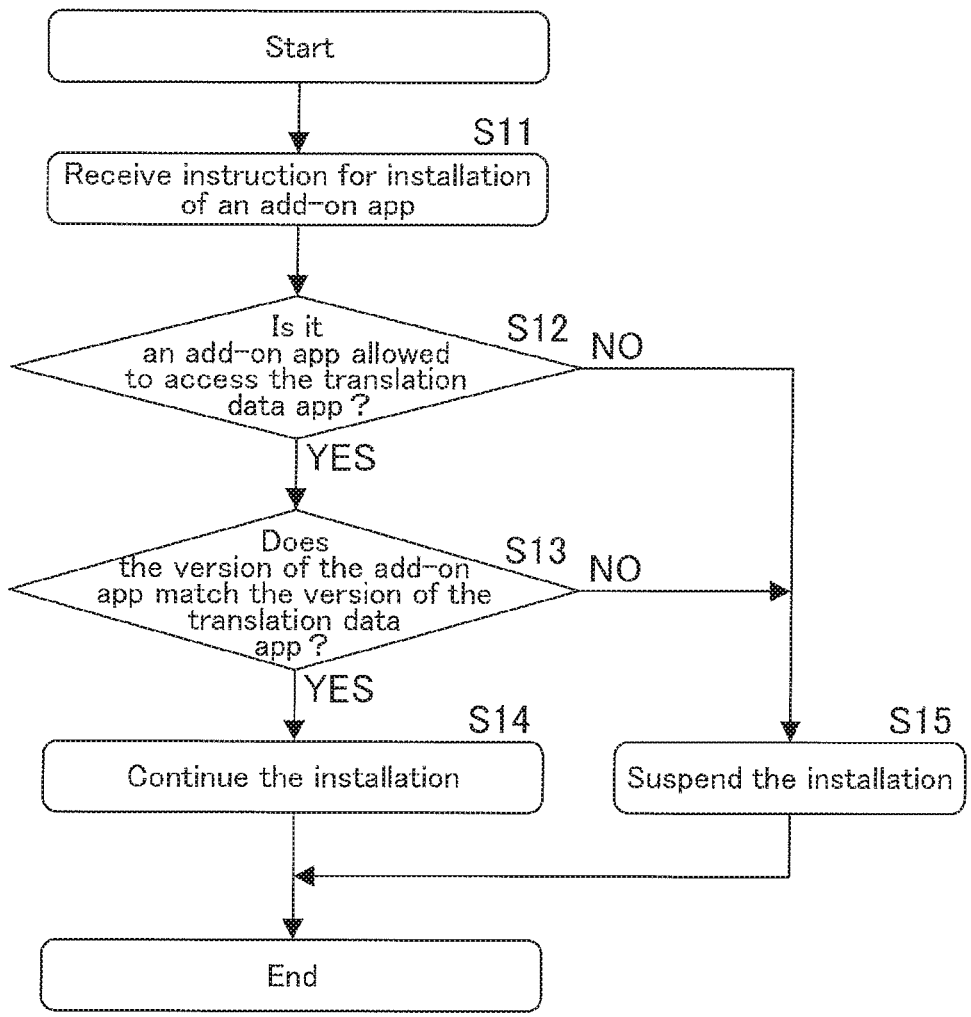
FIG. 7 is a flowchart representing how the image forming apparatus installs the add-on application.

FIG. 7 is a flowchart representing how the MFP 1 installs the add-on app 400.

In this embodiment, similar to the previous embodiment, the definition file 301 includes an allowed app ID, and the add-on app 400 not having the allowed app ID in the definition file 301 is prohibited from accessing the translation data app 300 or from being installed on the MFP 1.

More specifically, the MFP 1 needs to have a configuration such that the translation data file 302 included in the translation data app 300 is used in a proper manner. The translation data file 302 contains different terms depending on the time or the model it supports. So, the add-on apps 400 may obtain an incorrect term from the translation data file 302 to show on a display screen, which is confusing to the user. Furthermore, the add-on apps 400 may access the translation data app 300 not to extract a term from the translation data file 302 because of malfunction, which could make the MFP 1 perform unintended operations.

As a solution to these problems, the definition file 301 includes an allowed app ID of the add-on app 400 allowed to access the translation data app 300. When the definition file 301 defines the add-on app 400 as not being allowed to access, the add-on app 400 is prohibited from being installed on the MFP 1. Alternatively, when the definition file 301 defines the add-on app 400 as not being allowed to access, the add-on app 400 may be prohibited from accessing the translation data app 300. Prohibiting the add-on app 400 from accessing the translation data app 300 will be an effective solution when the add-on app 400 is installed before the translation data app 300.

In this embodiment, the translation data app 300 includes information of its version, and the add-on apps 400 include information of the version of the translation data app 300 they support. During installation of the add-on app 400 from the server 2, even when the definition file 301 defines the add-on app 400 as being allowed to access, the MFP 1 judges whether or not the version of the add-on app 400 matches the version of the translation data app 300. Only if that matches it, the MFP 1 continues installation of the add-on app 400. If the version information of the add-on app 400 does not match the version of the translation data app 300, the MFP 1 may transmit a notice of the version of the translation data app 300 to the server 2 in order to receive a proper version of the add-on app 400 from the server 2.

Referring to FIG. 7, in Step S11, instructions for installation of the add-on app 400 are received. In Step S12, it is judged whether or not the it is the add-on app 400 allowed to access the translation data app 300. The judgment on whether or not it is the add-on app 400 allowed to access the translation data app 300 depends on the allowed app ID in the definition file 301 which is included in the translation data app 300.

If it is the add-on app 400 allowed to access the translation data app 300 (YES in Step S12), it is then judged in Step S13 whether or not the version of the add-on app 400 matches the version of the translation data app 300. If that matches it (YES in Step S13), the routine continues the installation in Step S04.

In Step S12, it may be the add-on app 400 not allowed to access the translation data app 300 (NO in Step S12). In Step S13, the version of the add-on app 400 may mismatch the version of the translation data app 300 (NO in Step S13). In either case, the routine proceeds to Step S15 to suspend the installation.

Figure 8:
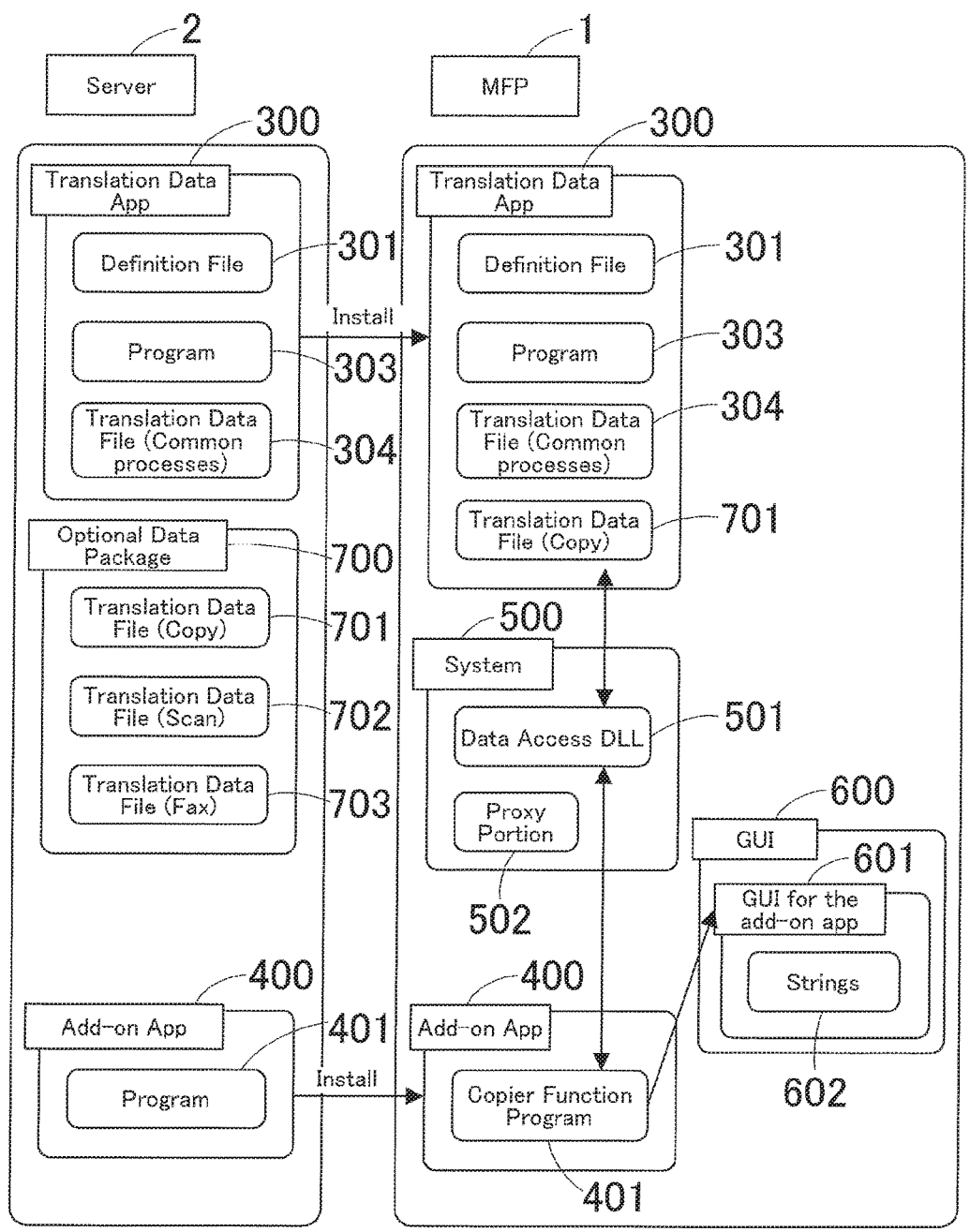
FIG. 8 relates to another embodiment of the present invention, and is a diagram for explaining how the add-on application generates a display screen after the image forming apparatus downloads the translation data application and the add-on application from a server.

FIG. 8 relates to another embodiment of the present invention, and is a diagram for explaining how the add-on app 400 generates a display screen after the MFP 1 downloads the translation data app 300 and the add-on app 400 from the server 2. FIG. 8 corresponds to FIG. 4.

In this embodiment, the translation data package 700 for the translation data app 300 contains translation data files each classified into a function group of the MFP 1. Specifically, the translation data package 700 contains a translation data file 701 devoted to copier function, a translation data file 702 devoted to scanner function, and a translation data file 703 devoted to facsimile function. The translation data app 300 includes the definition file 301 and a translation data file 304 devoted to common processes of all functions as a standard feature, as described above. The translation data app 300 further includes a program 303 for the MFP 1 to download and install the translation data files 701 to 703 classified into function groups from the optional data package 700 stored on the server 2. In addition to or instead of the translation data file 304 devoted to common processes of all functions, the translation data app 300 may include a translation data file devoted to apparatus information as a standard feature.

FIG. 9 illustrates an example of the translation data file 701 devoted to copier function and the translation data file 703 devoted to facsimile function. The translation data file 701 contains terms ID for identifying copier-related terms and strings in different languages for each term, and the translation data file 703 contains term IDs for identifying facsimile-related terms and strings in different languages for each term. The optional data package 700 may include a translation data file classified into an authentication process group, in addition to the translation data files 701 to 703 classified into copier function group, scanner function group, and facsimile function group, respectively.

In the embodiment of FIG. 8, a change is made to the configuration of the MFP 1 or the add-on apps 400 installed on the MFP 1. When a change is made, the MFP 1 downloads the translation data file 701, 702, or 703 as necessary from the optional data package 700 stored on the server 2, in accordance with the program 303 of the translation data app 300 installed on the MFP 1. For example, when the add-on app 400 is installed and the function information of the add-on app 400 indicates that it is related to copier function, the MFP 1 downloads and installs the translation data file 701 devoted to copier function from the optional data package 700 stored on the server 2. When the add-on app 400 is related to scanner function, the MFP 1 downloads and installs the translation data file 702 devoted to scanner function. In the example of FIG. 8, the MFP 1 downloads and installs the translation data file 701 devoted to copier function.

The MFP 1 may check all standard and optional functions installed on the MFP 1 itself, then download and install a translation data file devoted to a new function. For example, when facsimile function is added to the MFP 1, the MFP 1 downloads and installs the translation data file 703 devoted to facsimile function.

After installation of the translation data file 701, 702 or 703, the add-on app 400 accesses the translation data app 300, extracts strings for a target term from the translation data file 701, 702, or 703 or from the translation data file 304, and generates a display screen using the obtained strings, in a similar manner as described in the embodiment of FIG. 4.

In the example of FIG. 8, the optional data package 700 is a bundle of the translation data files 701 to 703 classified into function groups of the MFP 1. Alternatively, the optional data package 700 may be a bundle of translation data files 704 and 705 classified into language groups as referred to FIG. 10. FIG. 10 illustrates an example of the language data file 704 devoted to English and the translation data file 705 devoted to Japanese. The server 2 stores the language data files 704 and 705 devoted to languages. To localize the add-on apps 400 to a ship-to country or region, the MFP 1 can download and install the translation data file 704 or 705 as necessary from the server 2. The translation data files 704 and 705 may be a language data package that is a bundle of smaller translation data files each classified into function group.

As described above, for example, the translation data file 302 is classified into common processes group of all functions or to apparatus information, the translation data files 701 to 703 are classified into function groups, and the translation data files 704 and 705 are classified into language groups. The translation data app 300 includes a necessary translation data file, and the server 2 stores the optional data package 700 that is a bundle of translation data files. The translation data app 300 includes the program 303 for the MFP 1 to download and install a translation data file from the optional data package 700. In accordance with the program 303, the MFP 1 can download and install a translation data file as necessary from the optional data package 400 stored on the server 2. The translation data app 300 includes only as many translation data files as necessary, and the MFP 1 can keep more memory space available without the need of storing all translation data files on the storage device 104. With this configuration, the MFP 1 can save its hardware resources.

In other words, the MFP 1 possibly stores a huge amount of translation data because of having many functions. When the translation data app 300 including all translation data files is installed on the MFP 1, the translation data app 300 uses a large part of the hardware resources of the MFP 1. This can make some features of other MFP functions subject to limitations since other MFP functions also use the hardware resources. For example, image scanning can be limited to small sizes, only a small number of new apps can be installed, and only a small number of documents can be stored in a box that is a memory area. To avoid this risk, the MFP 1 downloads only as many translation data files as necessary from the optional data package 700 that is a bundle of translation data files each devoted to a group. With this configuration, the MFP 1 can save its hardware resources.

The MFP 1 may uninstall a translation data file that is no more necessary.

Figure 11:
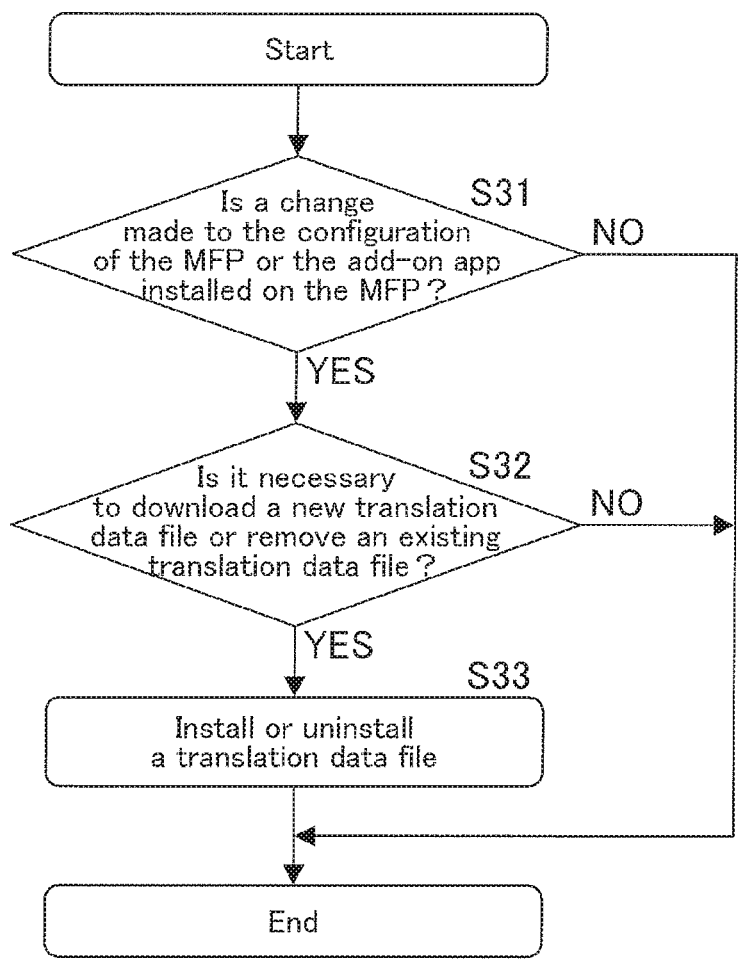
FIG. 11 is a flowchart representing how the image forming apparatus installs an optional data package that is a bundle of translation data files classified into function groups, as instructed by a program of the translation data application.
Figure 12:
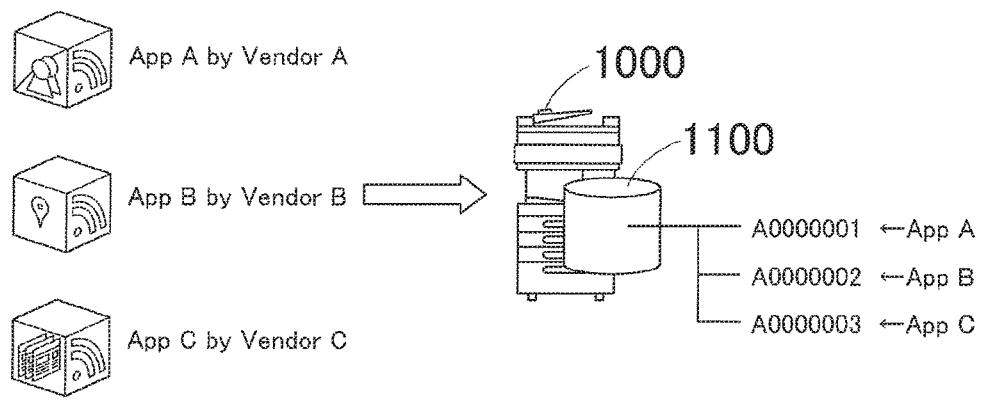
FIG. 12 is a view for explaining how a conventional image forming apparatus installs the add-on applications.
Figure 13:
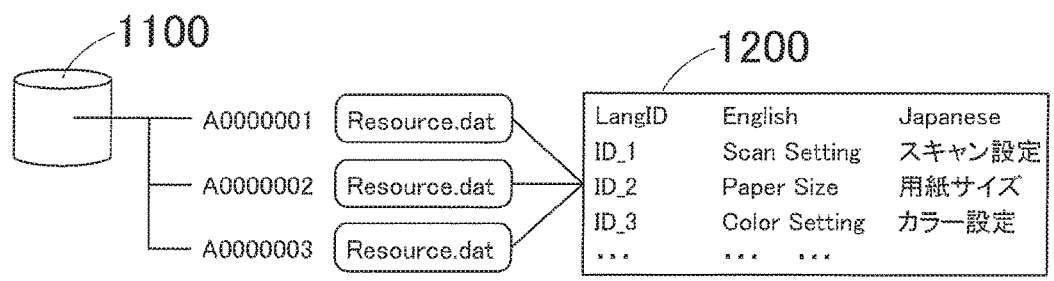
FIG. 13 is a view for explaining problems with the conventional image forming apparatus.

FIG. 11 relates to the embodiment of FIG. 8. This is a flowchart representing how the MFP downloads and installs the translation data file 701, 702 or 703 classified into function groups from the optional data package 700 stored on the server 2, in accordance with the program 303 of the translation data app 300.

In Step S31, it is judged whether or not a change is made to the configuration of the MFP 1 or the add-on app 400 installed on the MFP 1. When a new function is added to the MFP 1 or an existing function is removed from the MFP 1, for example, it is judged that a change is made to the configuration of the MFP 1. When the add-on app 400 is installed on the MFP 1 or uninstalled, for example, it is judged that a change is made to the add-on app 400 installed on the MFP 1.

If a change is made to the configuration of the MFP 1 or the add-on app 400 installed on the MFP 1 (YES in Step S31), it is further judged in Step S32 whether or not it is necessary to download the translation data file 701, 702, or 703 or to remove an existing translation data file, by comparing the translation data files installed on the MFP 1 to the configuration of the MFP 1 or the add-on app 400 installed on the MFP 1.

If it is necessary to download the translation data file 701, 702, or 703 or to remove an existing translation data file (YES in Step S32), the routine proceeds to Step S33, in which the translation data file 701, 702, or 703 is downloaded and installed from the server 2, or the existing translation data file is uninstalled from the MFP 1.

In Step S31, no change may be made to the configuration of the MFP 1 or the add-on app 400 installed on the MFP 1 (NO in Step S31). In Step S32, it may be unnecessary to download the translation data files 701 to 703 or to remove the translation data files installed on the MFP 1 (NO in Step S32). In either case, the routine immediately terminates.

The present invention, some embodiments of which are described above in details, should not be limited to these embodiments.

For example, the MFP 1 downloads and installs the translation data app 300 from the server 2 in these embodiments. Alternatively, the MFP 1 may originally store the translation data app 300 on the ROM 102. In this case, the MFP 1 installs the translation data app 300 from the ROM 102 when conditions allow execution of the translation data app 300. This will be an effective solution when a necessary run-time library for the translation data app 300 to run is disabled by default, for example.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising a hardware processor, the hardware processor configured to install a translation data application and an add-on application on the image forming apparatus, the add-on application for customizing functions of the image forming apparatus, wherein:
    the translation data application installed by the hardware processor has a data structure including:
    a translation data file containing multiple terms in one or more languages; and
    a definition file specifying an access method for the add-on application to access the translation data application and a function for the add-on application to extract a target term in a target language from the translation data file; and
    upon activation of the add-on application installed by the hardware processor, the add-on application performs the following operations:
    accessing the translation data application by the access method specified by the definition file, the definition file being included in the translation data application;
    extracting a target term in a target language from the translation data file by the function specified by the definition file; and
    generating a display screen using the extracted term.

2. The image forming apparatus according to claim 1, wherein a proxy function serving as an intermediary that blocks the add-on application from directly accessing the translation data application.

3. The image forming apparatus according to claim 1, wherein:
    the translation data application includes an icon image data file in addition to or instead of the translation data file, the icon image data file containing icon images; and
    the add-on application extracts a target icon image from the icon image data file by the function and generates a display screen using the extracted icon image.

4. The image forming apparatus according to claim 1, wherein the access method for the add-on application to access the translation data application is a link to an internal module of the image forming apparatus, the access method being specified by the definition file.

5. The image forming apparatus according to claim 4, wherein the module is enabled upon installation of the translation data application.

6. The image forming apparatus according to claim 1, wherein:
    the translation data file included in the translation data application is one of the translation data files classified into groups; and
    the data structure of the translation data application further includes a program for the image forming apparatus to download and install at least one of the translation data files from an external server.

7. The image forming apparatus according to claim 1, wherein the data structure of the translation data application further includes information defining the translation data application as being accessible from the add-on application.

8. The image forming apparatus according to claim 1, wherein the data structure of the translation data application further includes:
    definition information defining the add-on application as being or not being allowed to access the translation data application; and
    a prohibiting portion that prohibits the add-on application from accessing the translation data application or from being installed on the image forming apparatus, the add-on application not being allowed to access the translation data application.

9. A non-transitory computer-readable recording medium storing a translation data application, the translation data application being installed on an image forming apparatus, the translation data application providing a translation data file to an add-on application, the add-on application for customizing functions of the image forming apparatus, wherein:
    the translation data application includes: the translation data file containing multiple terms in one or more languages; and
    a definition file specifying an access method for the add-on application to access the translation data application, the definition file specifying a function for the add-on application to extract a target term in a target language from the translation data file;
    wherein, upon activation of the add-on application installed on the image forming apparatus, the add-on application performs the following operations:
        accessing the translation data application by the access method specified by the definition file, the definition file being included in the translation data application;
        extracting a target term in a target language from the translation data file by the function specified by the definition file; and
        generating a display screen using the extracted term.

10. The non-transitory computer-readable recording medium according to claim 9, wherein the translation data file includes icon images.

11. The non-transitory computer-readable recording medium according to claim 9, wherein the access method for the add-on application to access the translation data application is a link to an internal module of the image forming apparatus, the access method being specified by the definition file.

12. The non-transitory computer-readable recording medium according to claim 9, wherein:
- the translation data file included in the translation data application is one of the translation data files classified into groups; and
- the translation data application further includes a program for the image forming apparatus to download and install at least one of the translation data files from an external server.

13. The non-transitory computer-readable recording medium according to claim 9, wherein the translation data application further includes information defining the translation data application as being accessible from the add-on application.

14. The non-transitory computer-readable recording medium according to claim 9, wherein the translation data application further includes definition information defining the add-on application as being or not being allowed to access the translation data application.

* * * * *